Oct. 5, 1948.  W. H. SCHMITT  2,450,740
POTATO SLICER HAVING A STATIONARY WIRE
GRID AND A RECIPROCATING PLUNGER
Filed Nov. 18, 1946  2 Sheets-Sheet 1
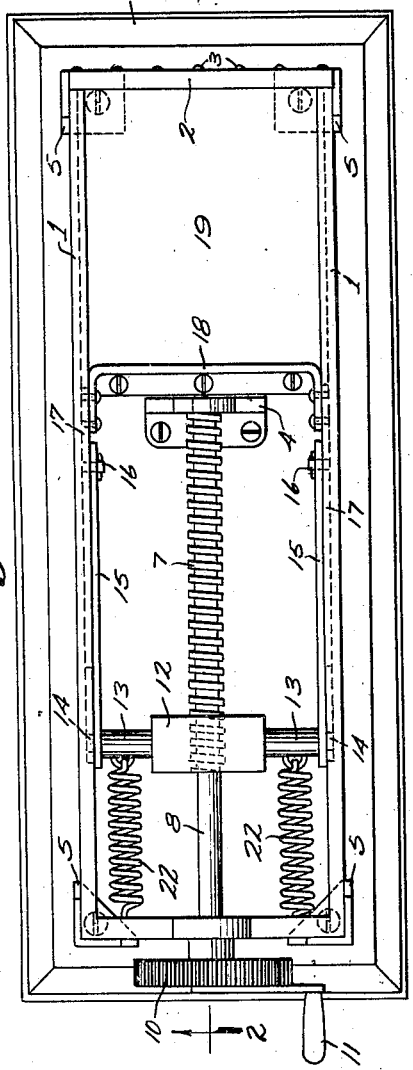
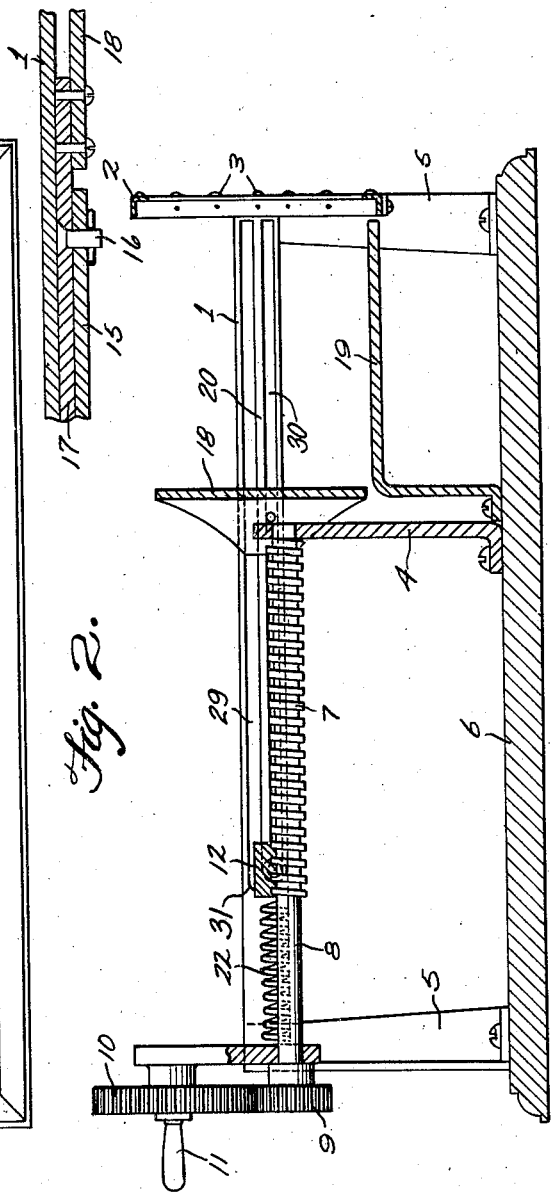
INVENTOR.
WILLIAM H. SCHMITT
BY *Victor J. Evans & Co.*
ATTORNEYS Oct. 5, 1948.  W. H. SCHMITT  2,450,740
POTATO SLICER HAVING A STATIONARY WIRE
GRID AND A RECIPROCATING PLUNGER
Filed Nov. 18, 1946  2 Sheets-Sheet 2
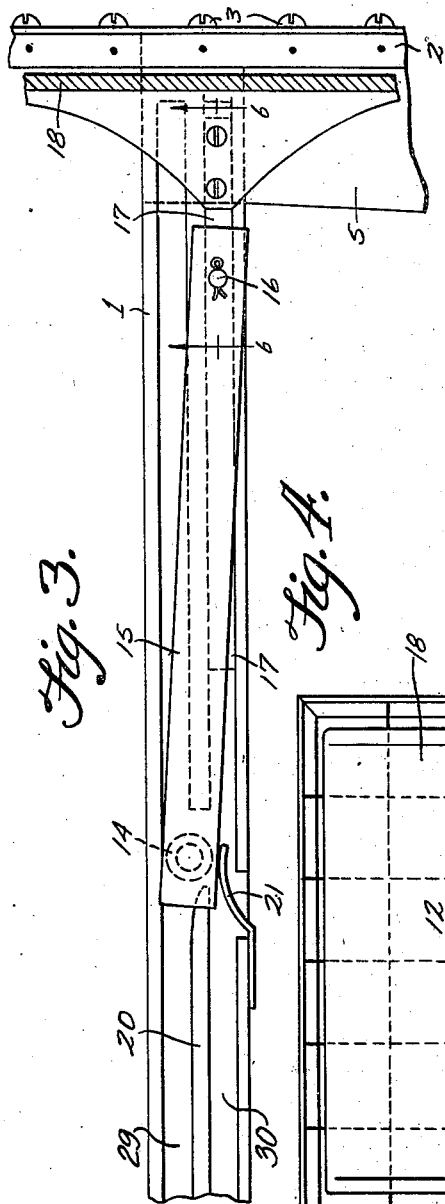
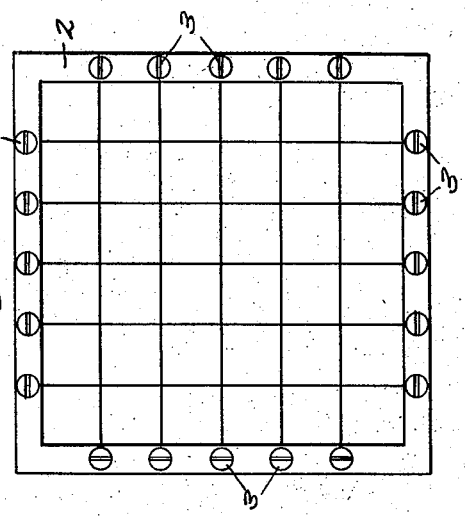
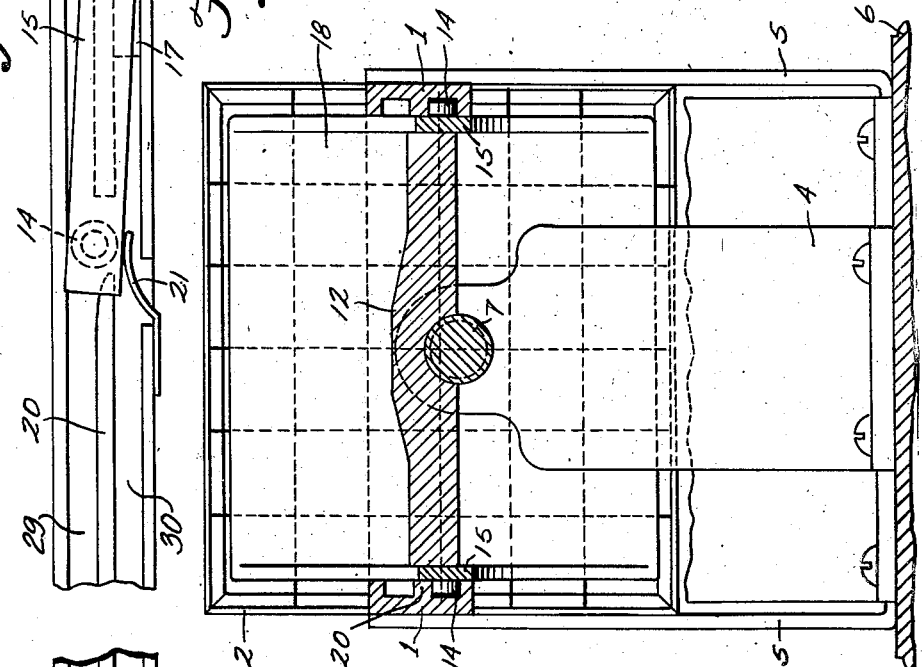
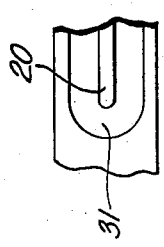
INVENTOR.
WILLIAM H. SCHMITT
BY Victor J. Evans & Co.
ATTORNEYS Patented Oct. 5, 1948

2,450,740

UNITED STATES PATENT OFFICE 2,450,740

POTATO SLICER HAVING A STATIONARY WIRE GRID AND A RECIPROCATING PLUNGER

William H. Schmitt, Grand Rapids, Mich.

Application November 18, 1946, Serial No. 710,584

1 Claim. (Cl. 146—169)

This invention relates to improvements in machines for cutting potatoes, and more particularly for cutting potatoes for French frying.

It is an object of the invention to provide a machine by means of which potatoes can be cut at high speed, and properly.

In accordance with the invention a potato is pushed through a cutter, which comprises a plurality of crossed wires, and after the potato has been cut, the pusher is returned automatically to its initial position to start to push another potato.

A further object is to provide a potato cutting machine which is simple in operation, with few parts to get out of order, and relatively inexpensive to manufacture.

These and other objects are attained by the novel construction and arrangement of parts hereinafter described and illustrated by the accompanying drawings, forming a part hereof, and in which:

Fig. 1 is a plan view of a potato cutting machine embodying the invention.

Fig. 2 is a sectional view taken on the line 2—2 of Fig. 1.

Fig. 3 is a side view of a potato pusher used in the machine.

Fig. 4 is a front view of the machine, partly in section.

Fig. 5 is a view of a potato cutter used in the machine.

Fig. 6 is a sectional view taken on the line 6—6 of Fig. 3.

Referring to the drawings, the potato cutting machine is shown to comprise a frame 1 made of channel steel, the ends of which are attached to the frame 2 of a cutter. The cutter comprises a plurality of thin steel wires at right angles to each other, the wires being stretched by screws 3. (See Fig. 5.) The frame 1 rests on legs 5, which are supported by a base 6. A bracket 4 mounted on the base 6 supports one end of a shaft 8 which has a threaded portion 7 in mesh with a half nut 12. Fixed to shaft 8 is a small gear 9 in mesh with a large gear 10 which is rotated by a crank 11.

Projecting from each side of the nut 12 are arms 13, having at their ends rollers 14 which move in the channel frame 1. Connected pivotally to the arms 13 are bars 15 which are pivotally connected at 16 to short bars 17, the latter being attached to a pusher plate 18.

In operation, the potato is placed on a small platform 19, and by turning the crank 11, the potato is pushed through the cutting wires in frame 2. When the cutting wires have been reached by pusher plate 18, a spring 21 in the channel frame, lifts the bar 15 to raise the nut 12 from engagement with the threaded shaft portion 7. The rollers are then raised to a position on ribs 20 in the channel frame, and nut 12 and bars 15 are drawn by springs 22 through the upper portion 29 of the channel back to their initial position in the lower portion 30 of the channel to push another potato, a curvular pathway 31 interconnecting the upper and lower portions of the channel for this purpose.

It will be seen that the automatic return of the pusher plate to its initial position to push a potato greatly speeds the operation of the machine, as the operator is only concerned with the pushing of the potato and does not have to waste time in returning the pusher plate to a starting position. The machine is simple in operation and positive, with few parts to get out of order. It can be easily operated by inexperienced persons to provide potatoes properly cut for French frying.

The above description is to be considered as illustrative and not limitative of the invention of which modifications can be made without departing from the spirit and scope of the invention as set forth in the appended claim.

The invention having been described, what is claimed is:

A device of the character described comprising a substantially rectangular horizontally extending frame having a channel formed in the inner face of each of the longer sides thereof, a vertically extending cutter affixed at one end of the frame, an interrupted rib formed in each of the channels and forming upper and lower portions in each of said channels, a longitudinally extending threaded shaft pivotally and centrally disposed in said frame, a half-nut normally engaging the shaft, an operating handle for the shaft, outwardly extending arms carried by the half-nut, a roller pivotally mounted at the outer end of each arm and normally disposed in the lower portions of the channels, a pusher having an arm at each side thereof, a link interconnecting each of the pusher arms with an arm carried by the half-nut, springs interconnecting the half-nut arms and the frame to normally urge the pusher away from the cutter, a spring for automatically moving the rollers from the lower portions of the channels to the upper portions thereof through the interrupted ribs when said pusher is adjacent the cutter and gravity-operated means for returning the rollers to the lower portions of the chan-nels when the pusher has been removed away from the cutter by the springs interconnecting the half-nut arms and the frame.

WILLIAM H. SCHMITT.

REFERENCES CITED

The following references are of record in the file of this patent:

UNITED STATES PATENTS

| Number | Name | Date |
|---|---|---|
| 194,370 | Pumphrey | Aug. 21, 1877 |
| 1,305,484 | Mosca | June 3, 1919 |
| 1,478,684 | Taylor et al. | Dec. 25, 1923 |

FOREIGN PATENTS

| Number | Country | Date |
|---|---|---|
| 271,185 | Great Britain | May 26, 1947 |
| 490,250 | Great Britain | Aug. 11, 1938 |